(12) United States Patent
Lu et al.

(10) Patent No.: US 7,405,796 B2
(45) Date of Patent: Jul. 29, 2008

(54) ELECTRODE ARRAY STRUCTURES OF FRINGE FIELDS SWITCHING MODE LCDS

(75) Inventors: Ruibo Lu, Orlando, FL (US); Qi Hong, Orlando, FL (US); Shin-Tson Wu, Oviedo, FL (US)

(73) Assignee: TPO Displays Corp., Miao-Li County (TW)

( * ) Notice: Subject to any disclaimer, the term of this patent is extended or adjusted under 35 U.S.C. 154(b) by 598 days.

(21) Appl. No.: 11/110,847

(22) Filed: Apr. 21, 2005

(65) Prior Publication Data

US 2005/0237465 A1    Oct. 27, 2005

(30) Foreign Application Priority Data

Apr. 23, 2004    (TW) ............... 93111406 A

(51) Int. Cl.
*G02F 1/1343* (2006.01)
(52) U.S. Cl. ..................... 349/141; 349/146
(58) Field of Classification Search ........... 349/142, 349/146
See application file for complete search history.

(56) References Cited

U.S. PATENT DOCUMENTS

| 5,886,762 | A | 3/1999 | Lee |
| 6,466,290 | B2 | 10/2002 | Kim et al. ............... 349/141 |
| 6,522,380 | B2 | 2/2003 | Lee et al. ............... 349/141 |
| 6,630,979 | B2 * | 10/2003 | Yang ................. 349/141 |

* cited by examiner

*Primary Examiner*—David Nelms
*Assistant Examiner*—Richard H Kim
(74) *Attorney, Agent, or Firm*—MH2 Technology Law Group LLP

(57) ABSTRACT

An electrode array structure in a pixel area of a fringe field switching mode LCD (FFS-LCD). A comb-shaped common electrode includes a first bar extending in a first direction and a plurality of first teeth extending in a second direction from the first bar, wherein each first tooth comprises a first bone having a plurality of discontinuous first trapezoidal protrusions on each side thereof. A comb-shaped pixel electrode comprises a second bar extending in the first direction and a plurality of second teeth extending in the second direction from the second bar, wherein each second tooth comprises a second bone having a plurality of discontinuous second trapezoidal protrusions on each side thereof.

21 Claims, 16 Drawing Sheets

ELECTRODE ARRAY STRUCTURES OF FRINGE FIELDS SWITCHING MODE LCDS

BACKGROUND

The invention relates to fringe field switching mode liquid crystal displays (FFS-LCDs), and more particularly, to FFS-LCD electrode array structures.

Generally, liquid crystal displays (LCDs) control light transmittance using an electrical field to display an image. In order to attain this end, LCDs include a liquid crystal panel having liquid crystal cells arranged in a matrix, and a driving circuit for driving the liquid crystal panel.

A common type of technology used in LCDs is a conventional twisted nematic (TN) display. Conventional TN displays, however, have intrinsic properties of narrow viewing characteristics and slow response time. Most particularly, TN displays have slow response time for gray scale operation.

In order to overcome these limitations, various techniques to enhance viewing angle have been suggested. One such technique is an in-plane switching mode liquid crystal display (IPS-LCD). FIG. 1 is a sectional view of a conventional IPS-LCD. In the conventional IPS-LCD, a pixel electrode 110 and a common electrode 120 are formed on a lower substrate (array substrate) 100 and a horizontal electrical field is generated therebetween to rearrange the liquid crystal molecules along the horizontal electrical field. Because the spacing between the pixel electrode 110 and the common electrode 120 is greater than the cell gap between lower and upper substrates 100 and 105, the liquid crystal molecules above the electrodes 110 and 120 cannot display due to the horizontal electrical field, causing a low aperture issue. Moreover, the pixel and common electrodes 110 and 120 comprise an opaque metal material, such as aluminum that is disposed on a transmissive region, thereby further decreasing the LCD aperture ratio.

In order to overcome the low aperture problem of the conventional IPS-LCDs, an FFS-LCD shown in FIG. 2A has been proposed. In the FFS-LCD, a transparent pixel electrode 210 and a transparent common electrode 220 are formed on a lower substrate 200 opposite an upper substrate 205. A distance "L" between the pixel and common electrodes 210 and 220, respectfully, is thinner than a width "W" of an electrode and a cell gap between two substrates 200 and 205. The horizontal electrical field is thus uniformly distributed between and above the electrodes 210 and 220 thus increasing the aperture ratio of the IPS-LCD. U.S. Pat. No. 6,466,290 to Kim et al., the entirety of which is hereby incorporated by reference, describes an FFS-LCD. U.S. Pat. No. 6,522,380 to Lee et al., the entirety of which is hereby incorporated by reference, describes an LCD with a high aperture ratio.

In the conventional FFS-LCD, the rectangular or straight electrodes 210 and 220, shown in FIG. 2B, are used to produce the fringe field therebetween. This electrode array structure, however, requires the FFS-LCD to have a relatively high operating voltage (>$6V_{rms}$) and a liquid crystal material comprising negative dielectric anisotropic ($\Delta\epsilon<0$) liquid crystals. The negative type liquid crystals are difficult to produce and have a higher viscosity. Thus, an FFS-LCD with an improved electrode array structure is desirable.

SUMMARY

Electrode array structures of fringe field switching mode liquid crystal displays (FFS-LCDs) are provided. In an exemplary embodiment of an FFS-LCD electrode array structure, a comb-shaped common electrode comprises a first bar extending in a first direction and a plurality of first teeth extending in a second direction from the first bar, wherein at least one first tooth comprises a first bone having a plurality of discontinuous first trapezoidal protrusions on at least one side thereof. A comb-shaped pixel electrode comprises a second bar extending in the first direction and a plurality of second teeth extending in the second direction from the second bar, wherein at least one second tooth comprises a second bone having a plurality of discontinuous second trapezoidal protrusions on at least one side thereof.

Fringe field switching mode liquid crystal displays (FFS-LCDs) are provided. An exemplary embodiment of an FFS-LCD comprises a first substrate and a second substrate disposed opposite each other with a liquid crystal layer interposed therebetween. An interdigitated comb-shaped common electrode and a comb-shaped pixel electrode are formed on the first substrate, wherein an electrical field generated therebetween can control orientation of liquid crystal molecules in the liquid crystal layer. The comb-shaped common electrode comprises a first bar extending in a first direction and a plurality of first teeth extending in a second direction from the first bar, wherein at least one first tooth comprises a first bone having a plurality of discontinuous first trapezoidal protrusions on at least one side thereof. The comb-shaped pixel electrode comprises a second bar extending in the first direction and a plurality of second teeth extending in the second direction from the second bar, wherein at least one second tooth comprises a second bone having a plurality of discontinuous second trapezoidal protrusions on at least one side thereof.

According to various embodiments, at least one first tooth can comprise a first bone having a plurality of discontinuous first trapezoidal protrusions on at least one side thereof and at least one second tooth comprises a second bone having a plurality of discontinuous second trapezoidal protrusions on at least one side thereof. The FFS-LCD can thus potentially achieve lower operating voltage (<$6V_{rms}$), lower power consumption, faster response time, higher light transmittance, and wider viewing characteristics.

BRIEF DESCRIPTION OF THE DRAWINGS

Various embodiments of the disclosure can be more fully understood by reading the subsequent detailed description in conjunction with the examples and references made to the accompanying drawings, wherein.

DETAILED DESCRIPTION

Electrode array structures of LCDs are provided. The electrode array structures are well suited for an LCD device, such as an IPS mode LCD, FFS mode LCD, and others. For convenience, representative FFS mode LCDs are illustrated, but are not intended to limit the disclosure.

Figure 3:
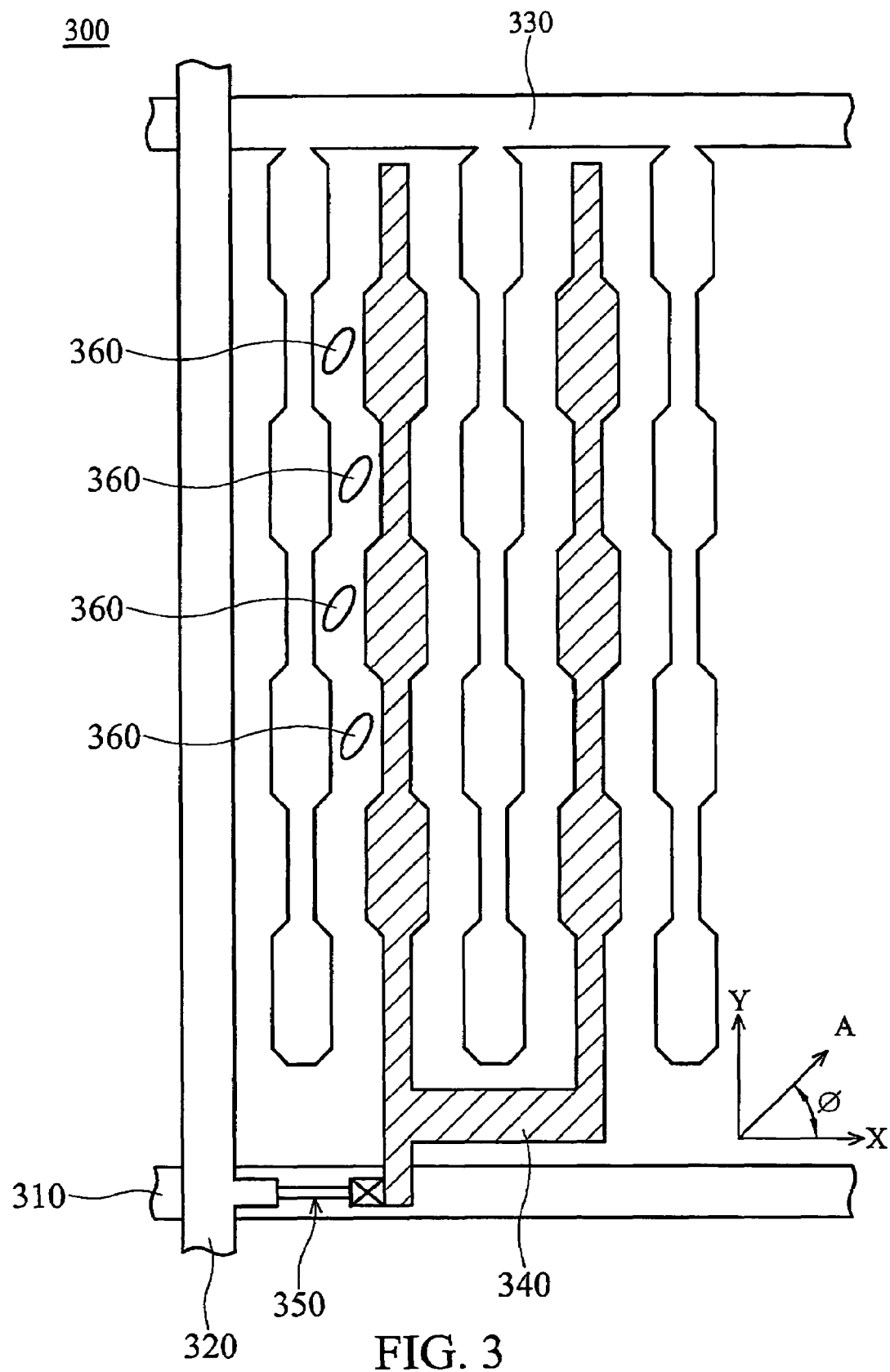
FIG. 3 is a top view showing a portion of an embodiment of an electrode array structure in a pixel area of an embodiment of an FFS-LCD.

FIG. 3 is a top view of one pixel area of an embodiment of an FFS-LCD. A gate line 310 and a data line 320 are formed on a thin film transistor (TFT) substrate 300 serving as a lower substrate 300, defining a pixel area. Although only one pixel area is drawn in FIG. 3, a liquid crystal display device can comprise numerous pixel areas arranged in an array.

In FIG. 3, the TFT substrate 300 can comprise a plurality of parallel gate lines 310 extending along an X-axis and a plurality of parallel data lines 320 extending along a Y-axis. The gate line 310 and the data line 320 can be arranged to form a matrix of pixel areas. A comb-shaped common electrode (or common line) 330 and a comb-shaped pixel electrode 340 can be additionally disposed in each pixel area and interdigitated, such that an electrical field is generated therebetween to control an orientation of liquid crystal molecules 360 in the FFS-LCD. At least one TFT device 350 can be disposed at a point near the intersection of the gate line 310 and the data line 320 and electrically connected to the pixel electrode 340. In addition, referring to FIG. 5A or 5B, an alignment film 520 can be spread over the lower substrate 300, and the alignment layer 520 can be rubbed in a direction A with an included angle Φ to the X-axis. As shown in FIG. 3, the liquid crystal molecules 360 can be homogeneously aligned in an initial state. For example, the azimuthal angle and a pretilt angle of the molecules 360 can be about 10° and 2°, respectively. The liquid crystal molecules 360 can be positive or negative dielectric anisotropic liquid crystal molecules.

Figure 4:
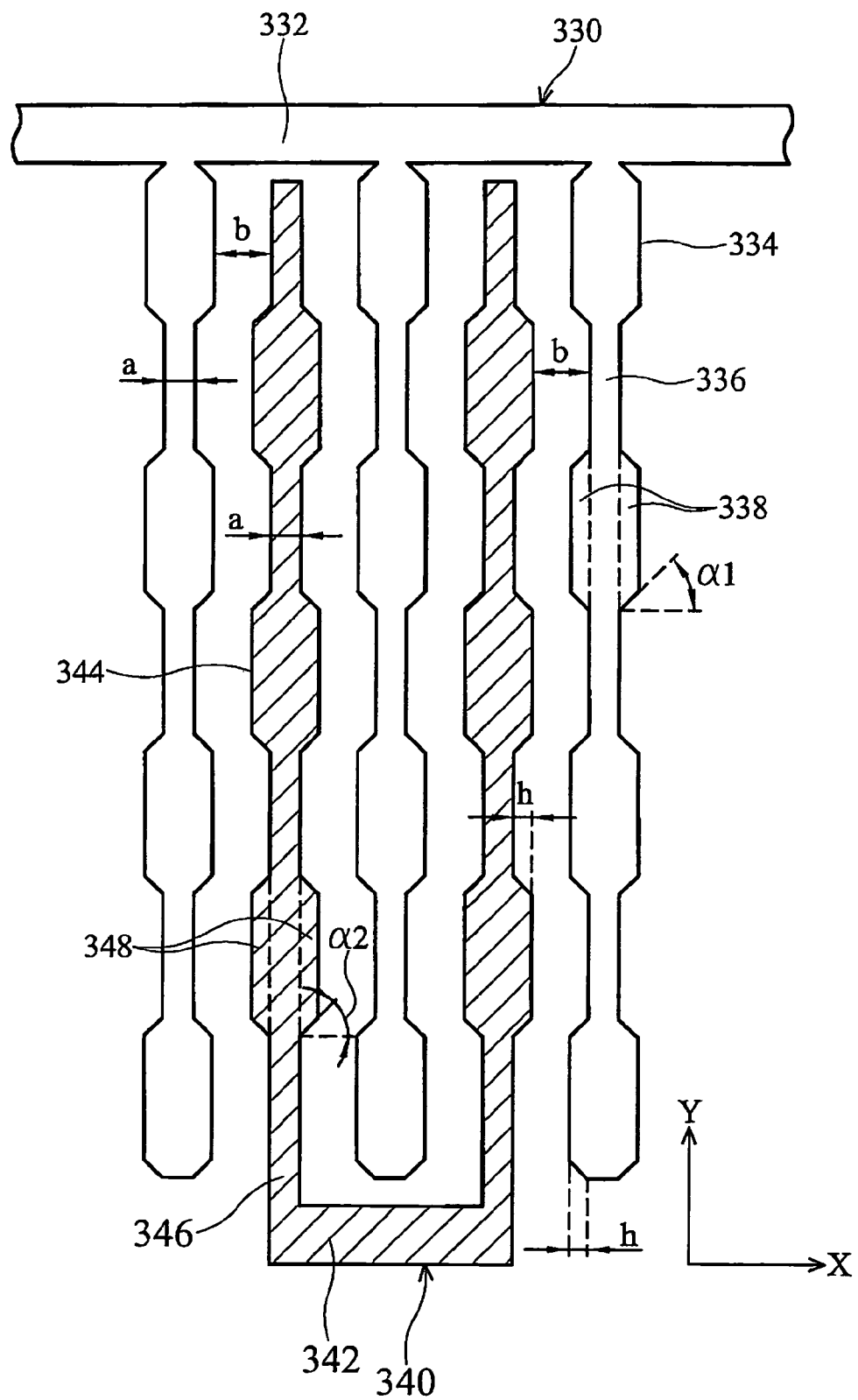
FIG. 4 is a schematic top view showing a portion of the electrode array structure shown in FIG. 3.

FIG. 4 shows a portion of the electrode array structure of FIG. 3. In each pixel area, the electrode array structure can comprise the comb-shaped common electrode 330 and the comb-shaped pixel electrode 340. The comb-shaped common electrode 330 can comprise a first bar 332 extending along the X-axis and a plurality of first teeth 334 extending along the Y-axis from the first bar 332. Each first tooth 334 can comprise a first bone 336 having a plurality of discontinuous first trapezoidal protrusions 338 on at least one side thereof. The common electrode 330 can be indium tin oxide (ITO), indium zinc oxide (IZO), or other transparent conductor. The comb-shaped pixel electrode 340 can comprise a second bar 342 extending along the X-axis and a plurality of second teeth 344 extending in the Y-axis from the second bar 342. At least one second tooth 344 can comprise a second bone 346 having a plurality of discontinuous second trapezoidal protrusions 348 on at least one side thereof. The pixel electrode 340 can be ITO, IZO, or other transparent conductor.

In some embodiments, at least one first tooth 334 can be adjacent to at least one second tooth 344. A top surface of at least one first trapezoidal protrusion 338 need not directly face that of each second trapezoidal protrusion 348.

Size conditions are disclosed, but are not intended to limit the disclosure. For example, the first bone 336 and the second bone 346 can have the same width "a". The first trapezoidal protrusion 338 and the second trapezoidal protrusion can have the same height "h". The first tooth 334 can be set apart from the second tooth 344 by a horizontal spacing "b". According to various embodiments, a relationship among a, h, and b can satisfy b<(a+2h). The width "a" can be between about 1.5 μm and 2.5 μm and the height "h" can be between about 1 μm and 10 μm. According to various embodiments, the width "a" can be 2 μm and the height "h" can be 1 μm. A first included angle "α1" between the sidewall of the first trapezoidal protrusion 338 and a normal (or normal line) of the first bone 336 can be between about 0° and 90°, and in some embodiments, 45°. A second included angle "α2" between the sidewall of the second trapezoidal protrusion 348 and a normal of the second bone 346 can be between about 0° and 90°, and in some embodiments, 45°. When an external voltage greater than a threshold voltage is applied to the TFT substrate 300, a fringe field can be generated in the liquid crystal layer causing the liquid crystal molecules 360 to arrange along a specific direction.

Figure 5A:
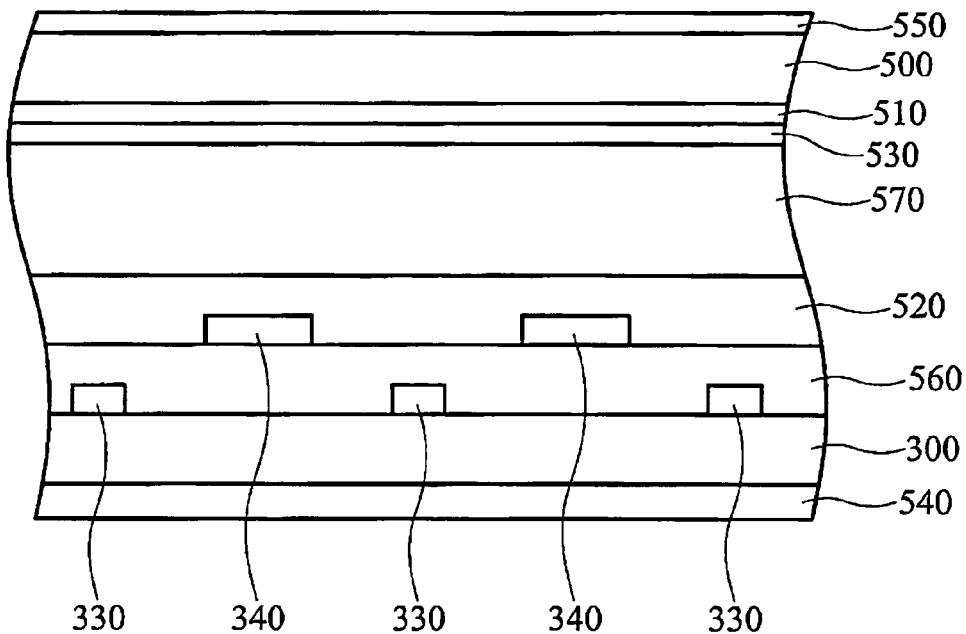
FIG. 5A is a sectional view of an embodiment of an electrode array structure of an FFS-LCD.
Figure 5B:
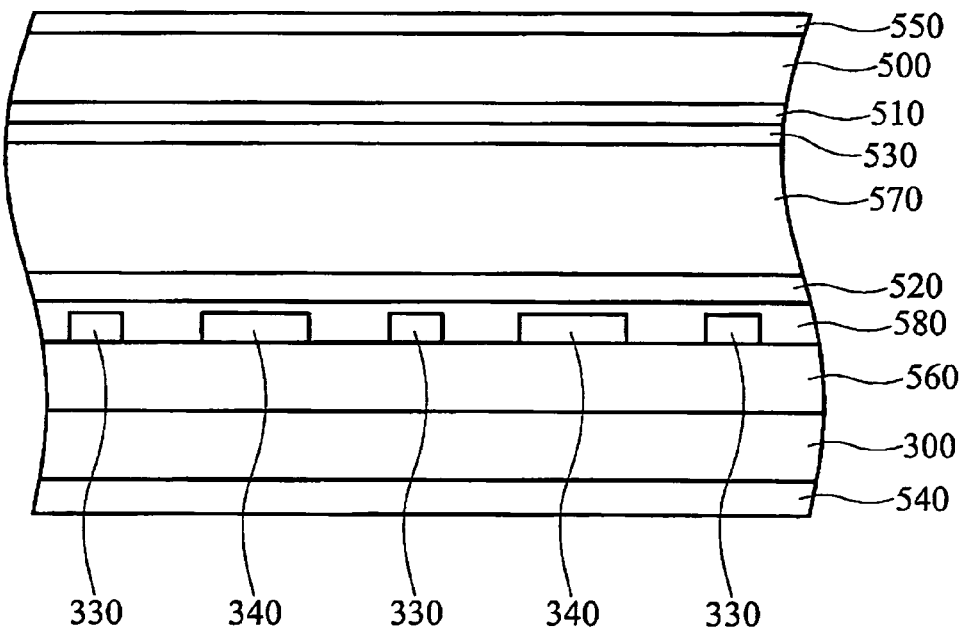
FIG. 5B is another sectional view of an embodiment of an electrode array structure of an FFS-LCD.

According to various embodiments, depending on, for example, different designs, the common electrode 330 and the pixel electrode 340 may or may not be coplanar. FIG. 5A shows a configuration of the common and pixel electrodes 330 and 340, respectively, formed on different levels. The process for forming the electrodes 330 and 340 on different levels is described, for example, in U.S. Pat. No. 6,522,380 references, and is therefore not discussed again herein. FIG. 5B shows another configuration for forming the common and pixel electrodes 330 and 340, respectively, on the same level. The process for forming the electrodes 330 and 340 on the same level is described, for example, in U.S. Pat. No. 5,886, 762, and is therefore not discussed again herein.

In FIGS. 5A and 5B, an upper substrate 500 can be a glass substrate disposed opposite the lower substrate 300. A color filter 510 can be disposed on the interior of the upper substrate 500. A first alignment film 520 can cover the common and pixel electrodes 330 and 340, respectively. A second alignment film 530 can cover the color filter 510. A first polarizer 540 can be disposed on the exterior of the lower substrate 300. A second polarizer 550 can be disposed on the exterior of the upper substrate 500. An insulating layer 560 can be disposed over the lower substrate 300. A liquid crystal layer 570 can be interposed between the lower and upper substrates 300 and 500. A principal axis of the first polarizer 540 can be parallel to the rubbing direction of the first alignment film 520. The principal axis of the first polarizer 540 can be perpendicular to that of the second polarizer 550. In FIG. 5B, a protection layer 580, such as SiO2, SiN or SiON, with a thickness of, for example, at least 1 µm can be disposed between the common and pixel electrodes 330 and 340, respectively.

The following experimental data are provided for better understanding.

According to various embodiments, an electrode array structure of an embodiment of the FFS-LCD, for example shown in FIG. 4, the testing parameters of the first test are as follows. The width "a" is 2 µm. The height "h" is 1 µm. The first included angle "α1" is 45°. The second included angle "α2" is 45°. Referring to FIG. 5B as a reference, the cell gap between the substrates 300 and 500 is 5 µm. In the first test, positive dielectric anisotropic (Δε>0) liquid crystal molecules (for example, Merck MLC-6692 type liquid crystal material) are employed. The parameters of the liquid crystal material comprise: birefringence Δn=0.085, dielectric anisotropy Δε=10.3 and rotational viscosity γ1=0.1 Pas. The liquid crystal molecules are homogeneously aligned in an initial state. The azimuthal angle and the pretilt angle of the liquid crystal molecules are about 10° and 2°, respectively. Thus, the threshold voltage of the FFS-LCD of the first test is about $1V_{rms}$. When an operating voltage is applied, the long axes of the positive dielectric anisotropic liquid crystal molecules are reoriented along the electrical field due to the fringe field effect.

Figure 6:
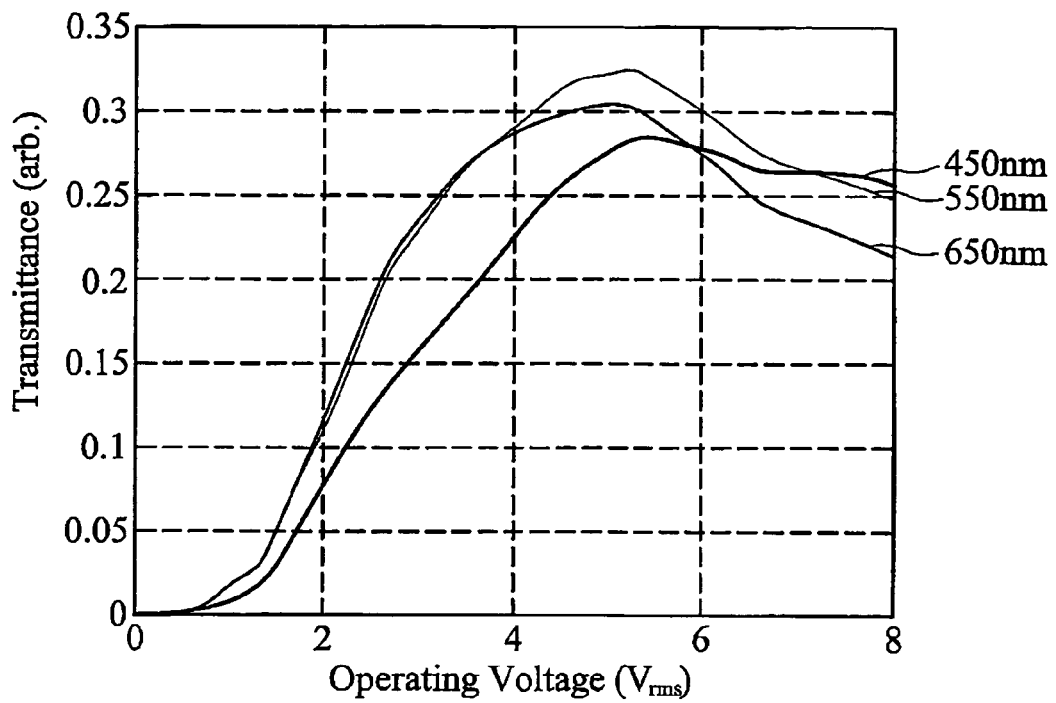
FIG. 6 is a graphical plot of the relationship between light transmittance and operating voltage of a first test of an embodiment of an FFS-LCD.
Figure 7:
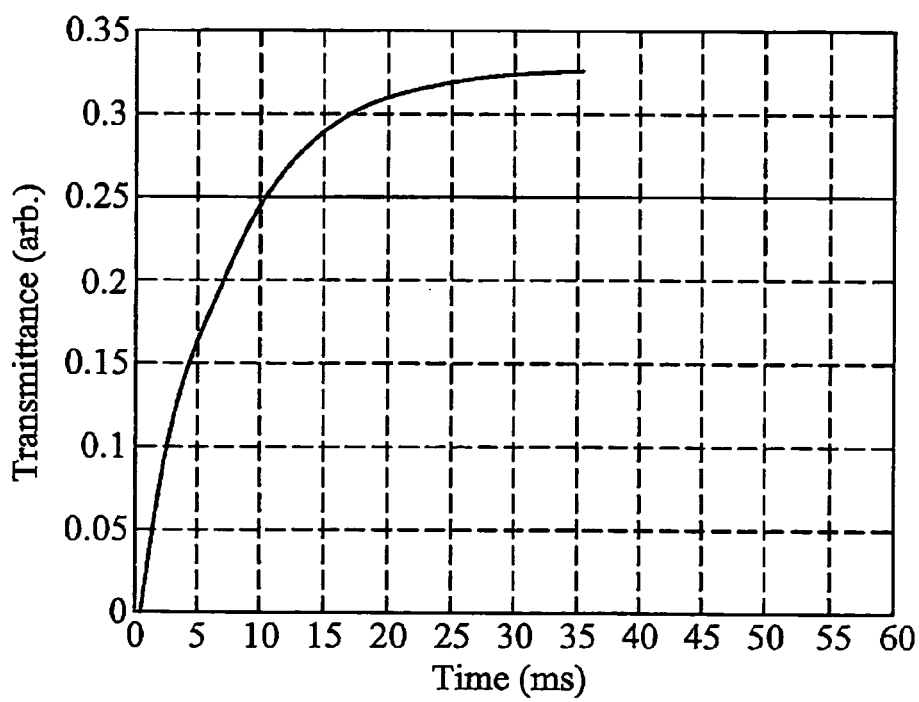
FIG. 7 is a graphical plot of the relationship between light transmittance and response time of the first test of an embodiment of an FFS-LCD.
Figure 8:
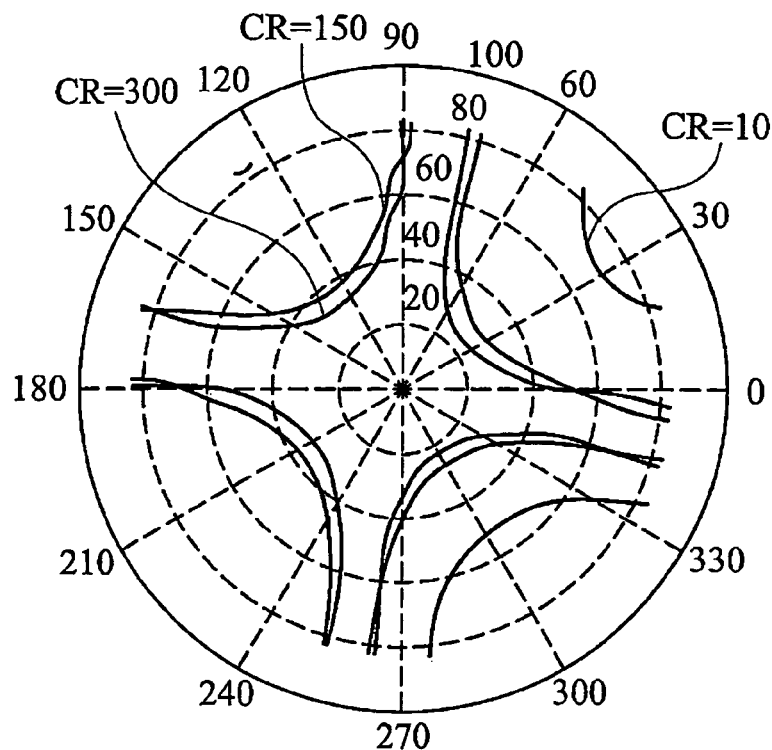
FIG. 8 is a viewing cone of the first test of an embodiment of an FFS-LCD.

FIG. 6 is a graphical plot of the relationship between light transmittance and operating voltage of the first test of an embodiment of an FFS-LCD. The wavelengths of the backlight (not shown) of the FFS-LCD are set at 450 nm, 550 nm, and 650 nm. As shown in FIG. 6, the maximum transmittance reaches 32% at the operating voltage of $4.5V_{rms}$. FIG. 7 is a graphical plot of the relationship between light transmittance and response time of the first test of an embodiment of an FFS-LCD. As shown in FIG. 7, the maximum transmittance reaches 32% at the response time of about 17 msec when the operating voltage of $4.5V_{rms}$ is applied. FIG. 8 is a viewing cone wider than ±70° of the first test of an embodiment of an FFS-LCD.

Figure 1:
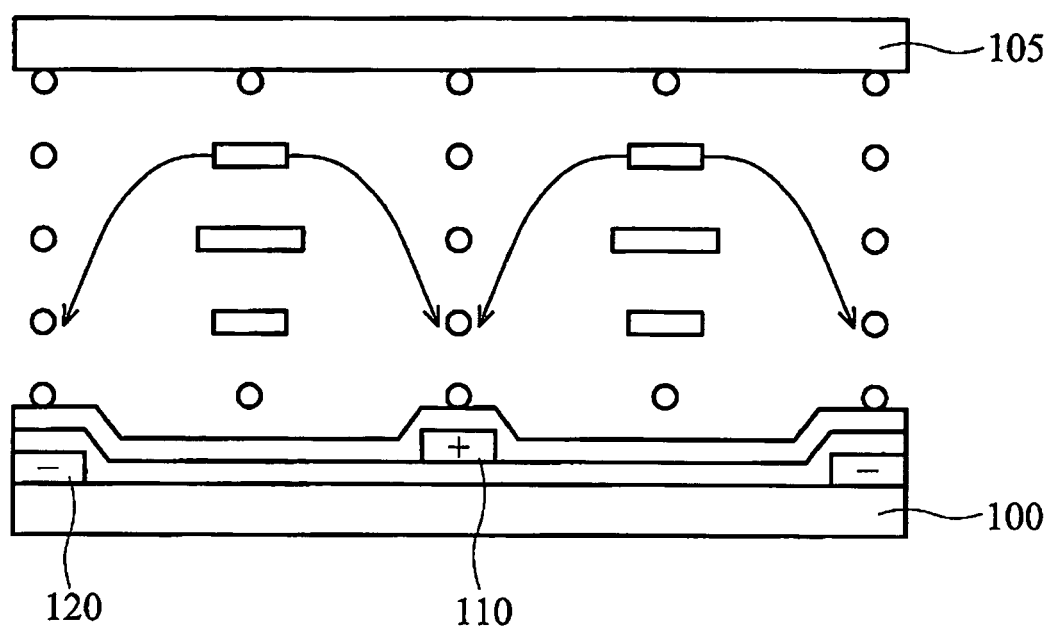
FIG. 1 is a schematic sectional view of a conventional IPS-LCD.

For the purposes of comparison, a test comparable to the first test is provided. The comparison test uses the conventional IPS-LCD shown in FIG. 1 as a benchmark. Referring to FIG. 1, the testing parameters of the comparison test are as follows. The cell gap between the lower and upper substrates is 4 µm. The spacing between the pixel and common electrodes 110 and 120 is 8 µm. The width of the electrode 110/120 is 4 µm. In the comparison test, the liquid crystal material used in the first test was used.

Figure 9:
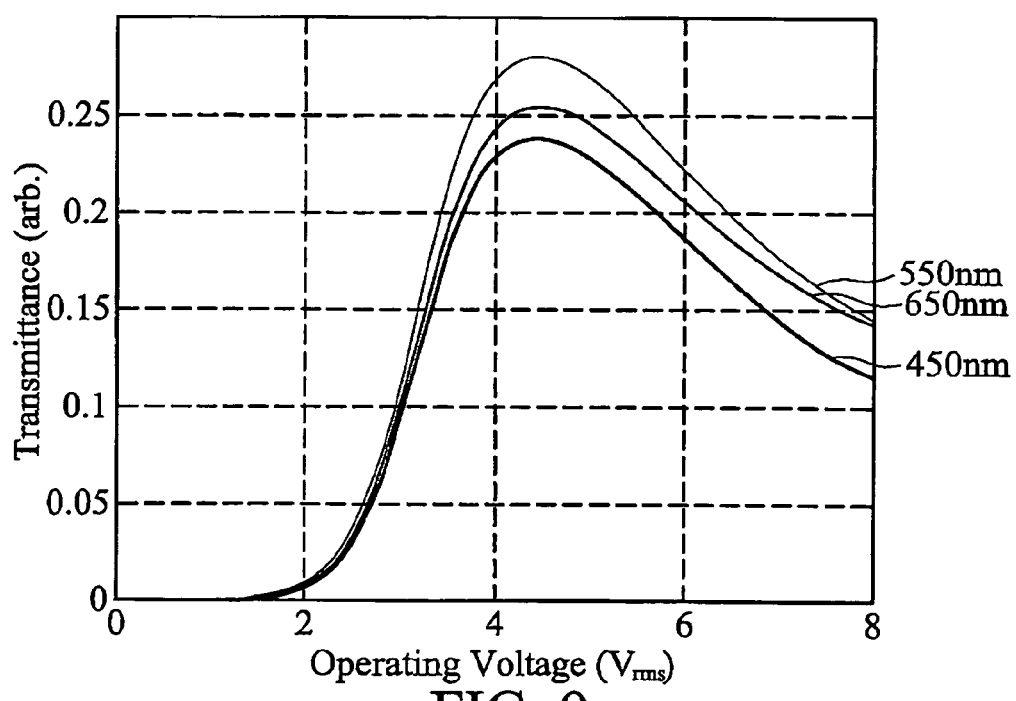
FIG. 9 is a graphical plot of the relationship between light transmittance and operating voltage of a comparison test of the first test.
Figure 10:
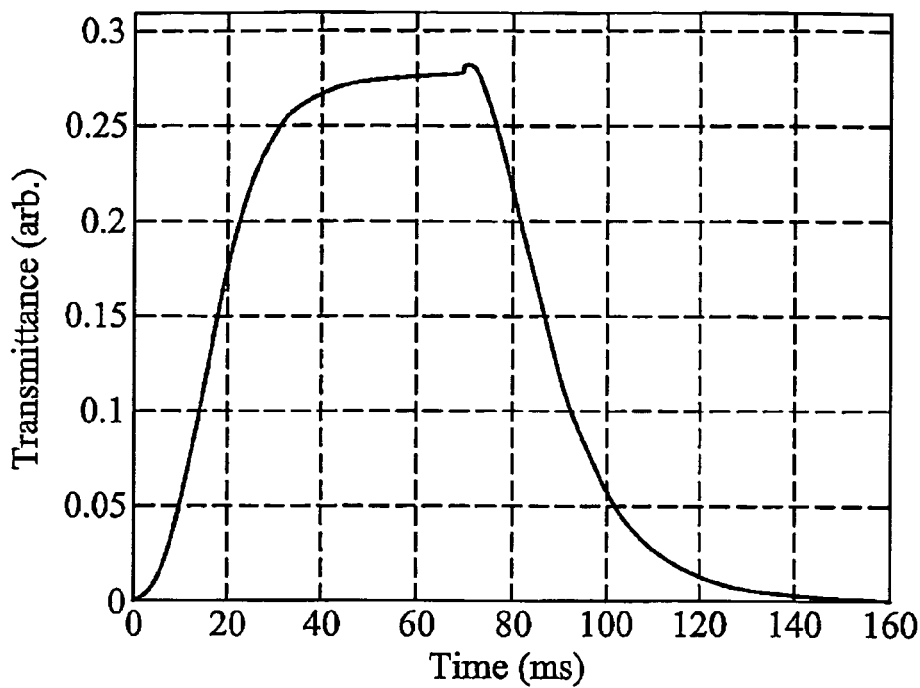
FIG. 10 is a graphical plot of the relationship between light transmittance and response time of the comparison test of the first test.
Figure 11:
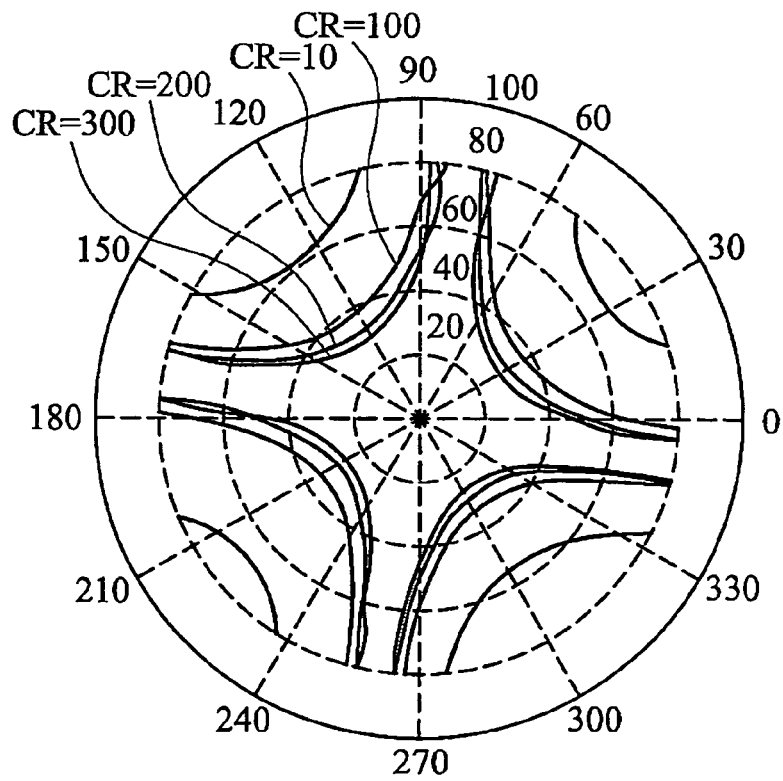
FIG. 11 is a viewing cone of the comparison test of the first test.

FIG. 9 is a graphical plot of the relationship between light transmittance and operating voltage of the comparison test of the first test. The wavelengths of the backlight (not shown) of the conventional IPS-LCD are set at 450 nm, 550 nm, and 650 nm. As shown in FIG. 9, the maximum transmittance reaches 27% at the operating voltage of $4.5V_{rms}$. FIG. 10 is a graphical plot of the relationship between light transmittance and response time of the comparison test of the first test. As shown in FIG. 10, the maximum transmittance reaches 27% at the response time of about 32 msec when the operating voltage of $4.5V_{rms}$ is applied. FIG. 11 is a viewing cone of the comparison test, slightly narrower than the first test.

Compared with the conventional IPS-LCD, an embodiment of the FFS-LCD has higher transmittance, faster response time and wider viewing.

In another example, the electrode array structure of an embodiment of the FFS-LCD, for example shown in FIG. 4, testing parameters of a second test are as follows. The width "a" is 3 µm. The height "h" is 1 µm. The first included angle "α1" is 45°. The second included angle "α2" is 45°. Referring to FIG. 5B, the cell gap between the substrates 300 and 500 is 4.8 µm. In the second test, positive dielectric anisotropic (Δε>0) liquid crystal molecules (for example, Merck MLC-6692 type liquid crystal material) are employed. The parameters of the liquid crystal material comprise: birefringence Δn=0.085, dielectric anisotropy Δε=10.3 and rotational viscosity γ1=0.1 Pas. The liquid crystal molecules are homogeneously aligned in an initial state. The azimuthal angle and the pretilt angle of the liquid crystal molecules are about 10° and 2°, respectively. Thus, the threshold voltage of the FFS-LCD of the first test is less than $1V_{rms}$. When an operating voltage is applied, the long axes of the positive dielectric anisotropic liquid crystal molecules are reoriented along the electrical field due to the fringe field effect.

Figure 12:
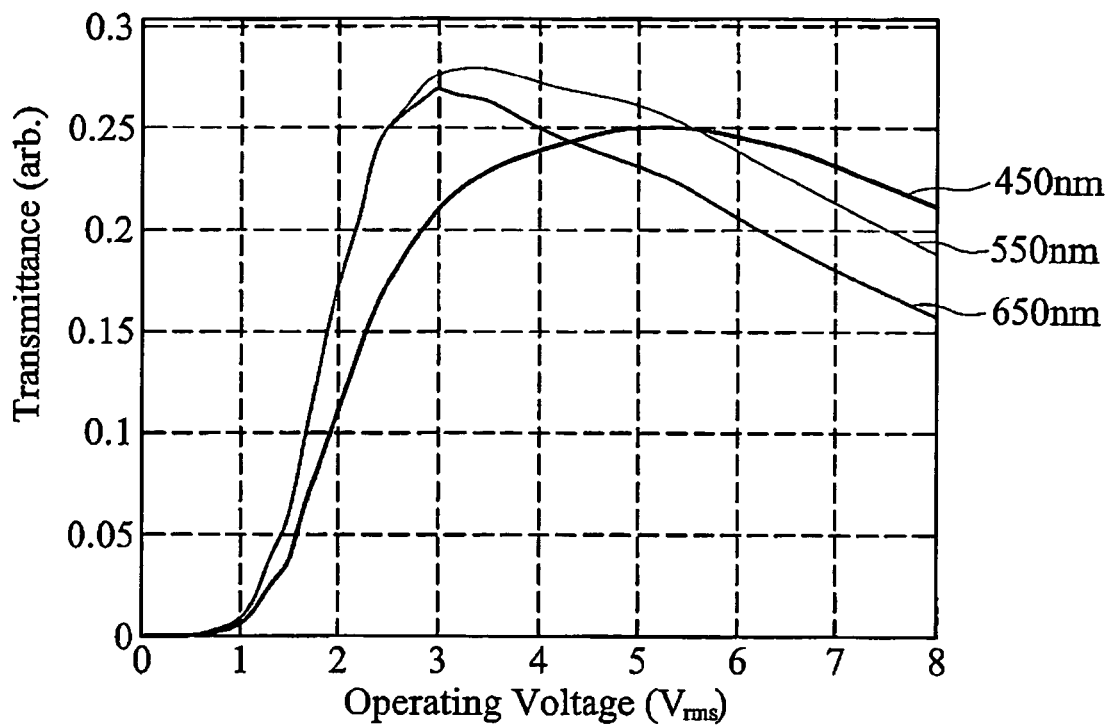
FIG. 12 is a graphical plot of the relationship between light transmittance and operating voltage of a second test of an embodiment of an FFS-LCD.
Figure 13:
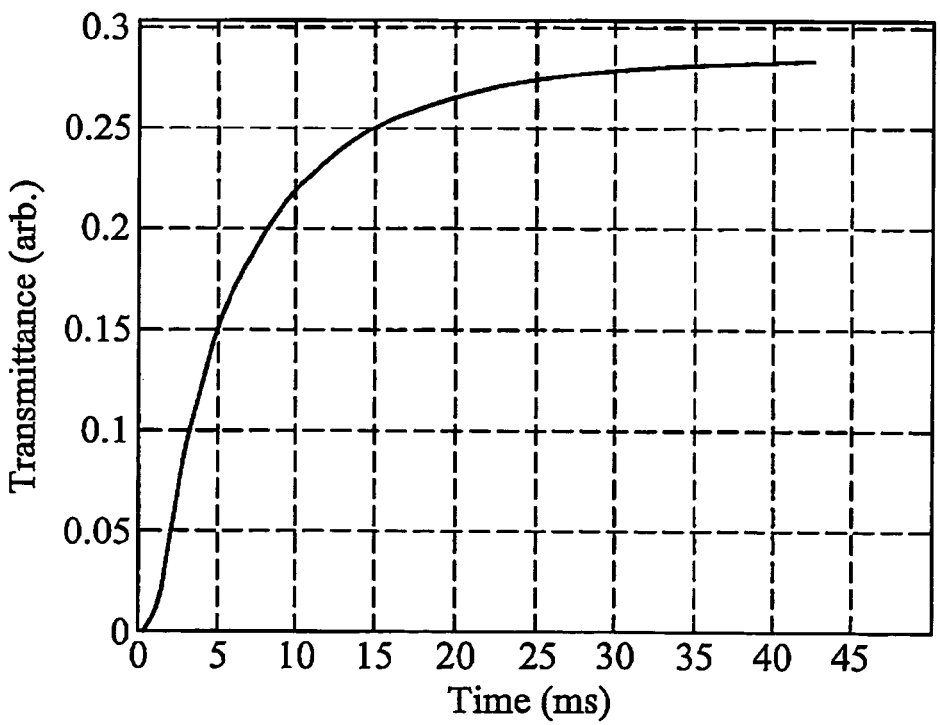
FIG. 13 is a graphical plot of the relationship between light transmittance and response time of the second test of an embodiment of an FFS-LCD.
Figure 14:
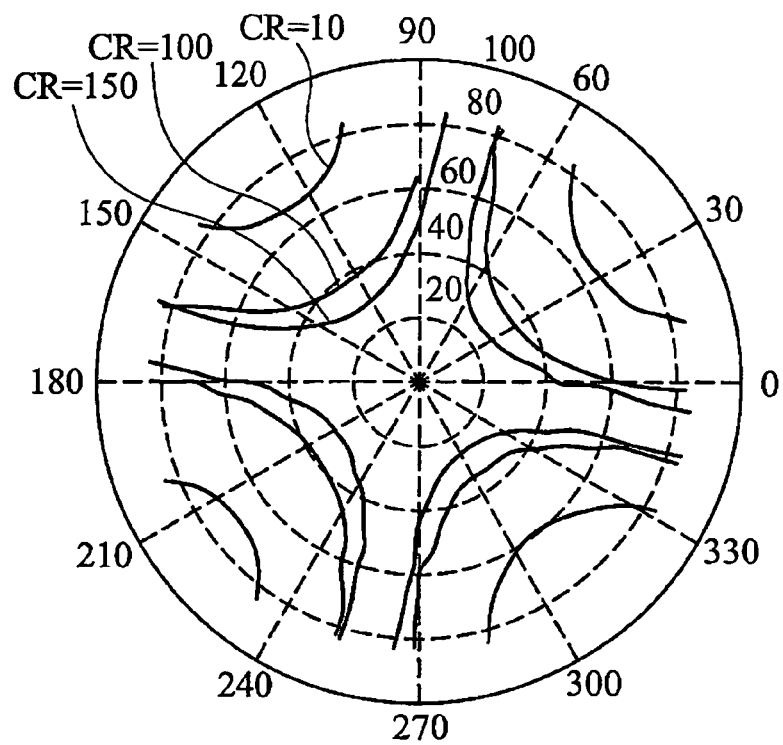
FIG. 14 is a viewing cone of the second test of an embodiment of an FFS-LCD.

FIG. 12 is a graphical plot of the relationship between light transmittance and operating voltage of the second test of an embodiment of an FFS-LCD. The wavelengths of the backlight (not shown) of the FFS-LCD are set at 450 nm, 550 nm, and 650 nm. As shown in FIG. 12, the maximum transmittance reaches 28.3% at the operating voltage of $3.5V_{rms}$. FIG. 13 is a graphical plot of the relationship between light transmittance and response time of the second test of an embodiment of an FFS-LCD. As shown in FIG. 12, the maximum transmittance reaches 28.3% at the response time of about 18 msec when the operating voltage of $3.5V_{rms}$ is applied. FIG. 14 is a viewing cone wider than ±70° of the second test of an embodiment of an FFS-LCD.

Figure 2A:
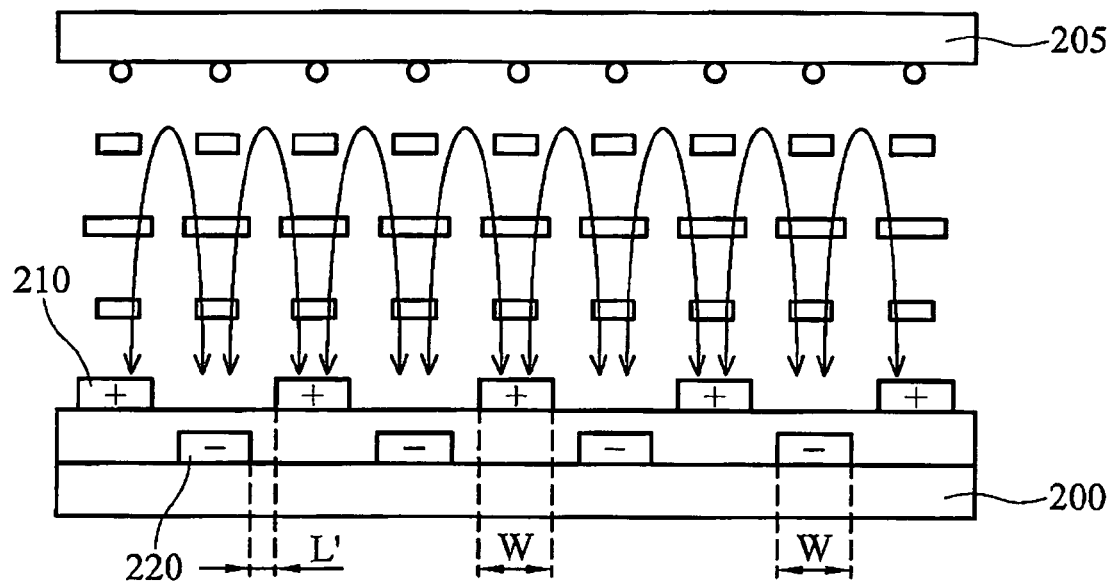
FIG. 2A is a schematic sectional view of a conventional FFS-LCD.
Figure 2B:
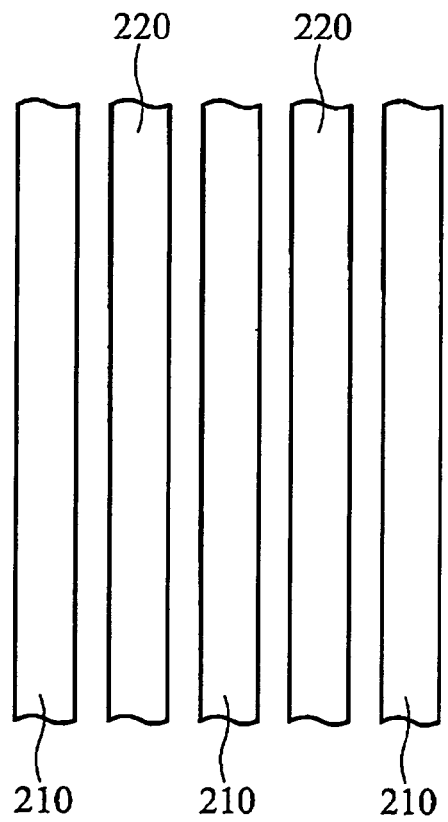
FIG. 2B is a schematic top view showing a portion of an electrode array structure of a conventional FFS-LCD.

For the purposes of comparison, a test comparable to the second test is provided. The comparison test uses the conventional FFS-LCD shown in FIGS. 2A and 2B as a benchmark. In the comparison test, the liquid crystal material used in the second test was used. Referring to FIGS. 2A and 2B, the width "W" of the electrode 210/220 is 5 µm. Also, the other parameters are the same as the second test.

Figure 15:
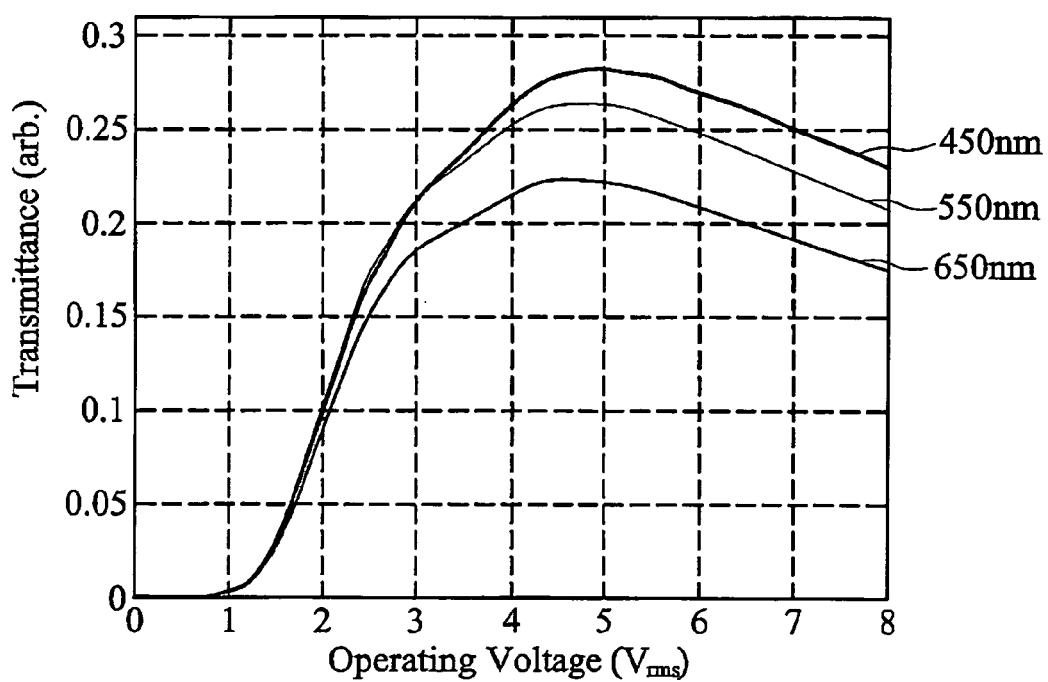
FIG. 15 is a graphical plot of the relationship between light transmittance and operating voltage of a comparison test of the second test.
Figure 16:
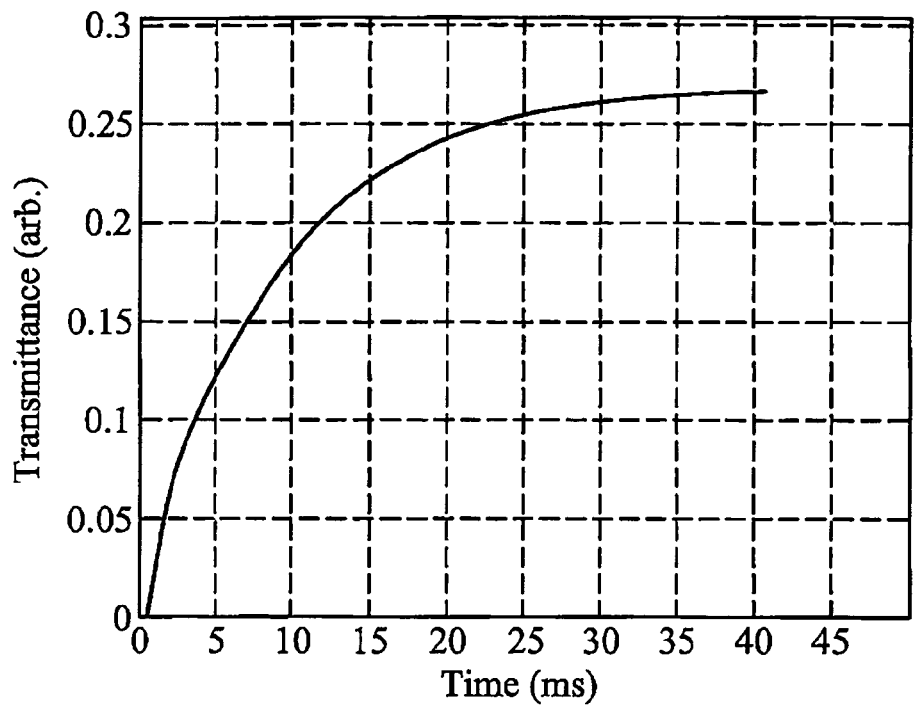
FIG. 16 is a graphical plot of the relationship between light transmittance and response time of the comparison test of the second test.
Figure 17:
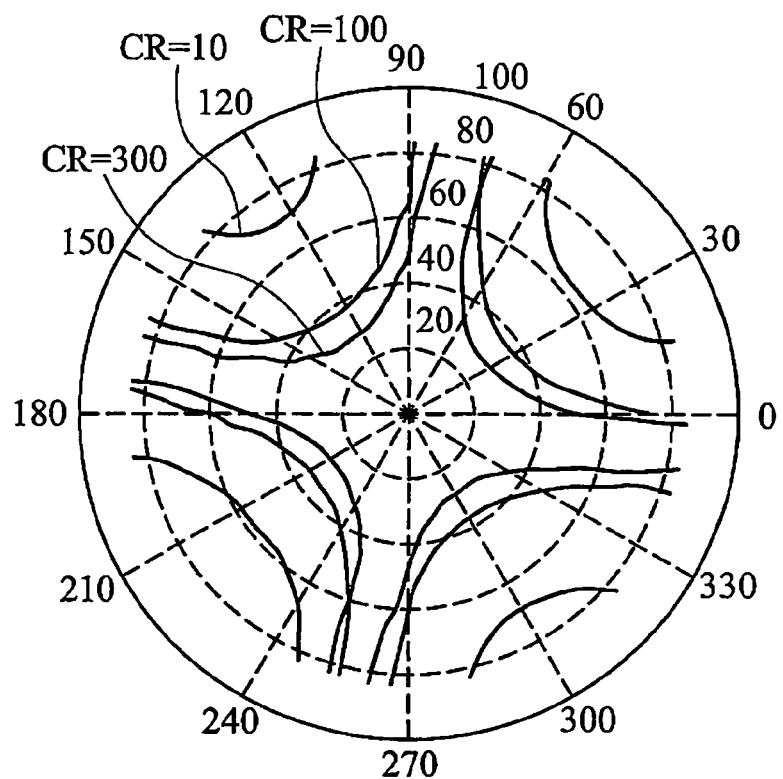
FIG. 17 is a viewing cone of the comparison test of the second test.

FIG. 15 is a graphical plot of the relationship between light transmittance and operating voltage of the comparison test of the second test. The wavelengths of the backlight (not shown) of the conventional FFS-LCD are set at 450 nm, 550 nm, and 650 nm. As shown in FIG. 15, the maximum transmittance reaches 26.5% at the operating voltage of $4.75V_{rms}$. Note that, referring to FIG. 12, the FFS-LCD of the second test can reach a higher transmittance (28.3%) at a lower operating voltage ($3.5V_{rms}$). FIG. 16 is a graphical plot of the relationship between light transmittance and response time of the comparison test of the second test. As shown in FIG. 16, the maximum transmittance reaches 26.5% at the response time of about 25 msec when the operating voltage of $4.75V_{rms}$ is applied. FIG. 17 is a viewing cone of the comparison test of the second test, narrower than the second test.

Compared with the conventional FFS-LCD, an embodiment of the FFS-LCD has lower operating voltage, higher transmittance, faster response time and wider viewing.

In another embodiment, the electrode array structure of an embodiment of the FFS-LCD, for example shown in FIG. 4, testing parameters of a third test are as follows. The width "a" is 3 μm. The height "h" is 1 μm. The first included angle "α1" is 45°. The second included angle "α2" is 45°. Referring to FIG. 5B, the cell gap between the substrates 300 and 500 is 4 μm. In the third test, negative dielectric an isotropic (Δε<0) liquid crystal molecules (which may be Merck MLC-6609 type liquid crystal material) are employed. The parameters of the liquid crystal material comprise: birefringence Δn=0.0777, dielectric anisotropy Δε=−3.7 and rotational viscosity γ1=0.16 Pas. The liquid crystal molecules are homogeneously aligned in an initial state. The azimuthal angle and the pretilt angle of the liquid crystal molecules are about 80° and 2°, respectively. When an operating voltage is applied, the long axes of the negative dielectric anisotropic liquid crystal molecules are reoriented along the vertical direction of the electrical field due to the fringe field effect.

Figure 18:
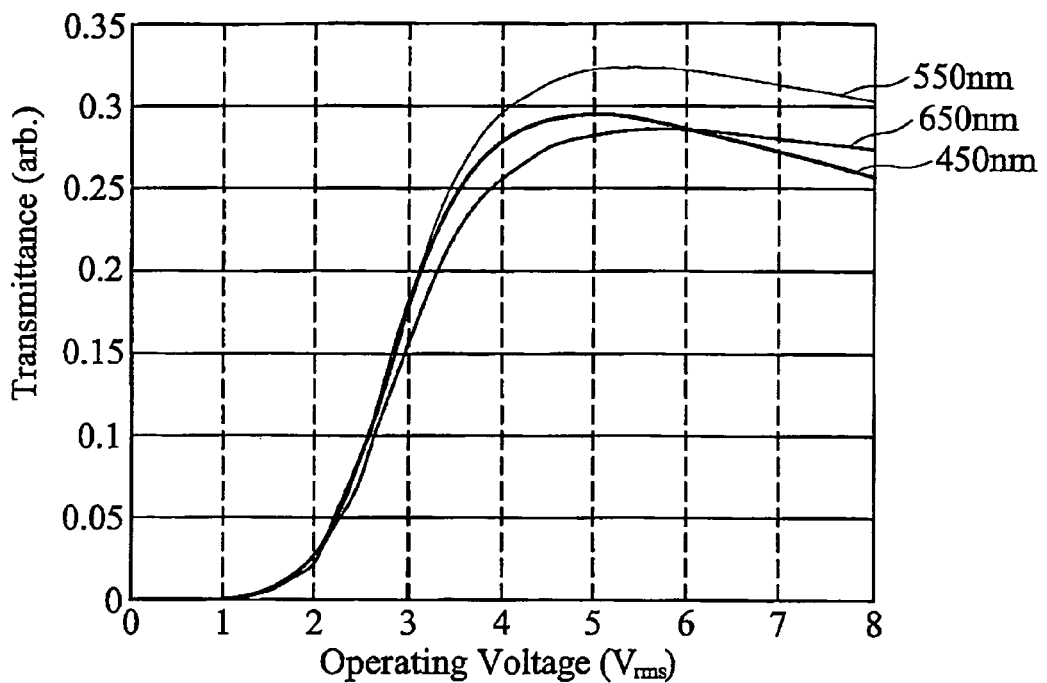
FIG. 18 is a graphical plot of the relationship between light transmittance and operating voltage of a third test of an embodiment of an FFS-LCD.
Figure 19:
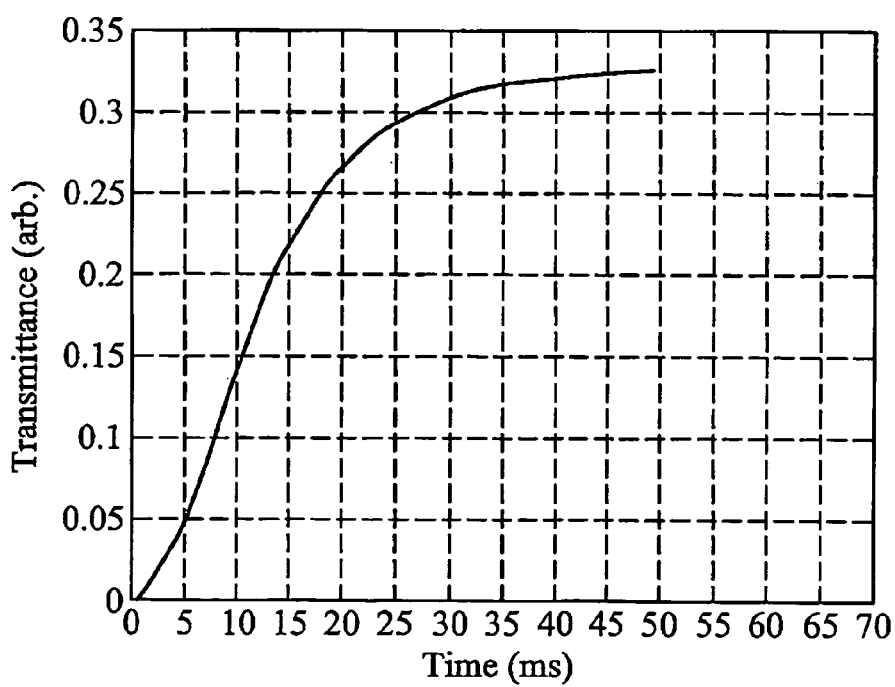
FIG. 19 is a graphical plot of the relationship between light transmittance and response time of the third test of an embodiment of an FFS-LCD.
Figure 20:
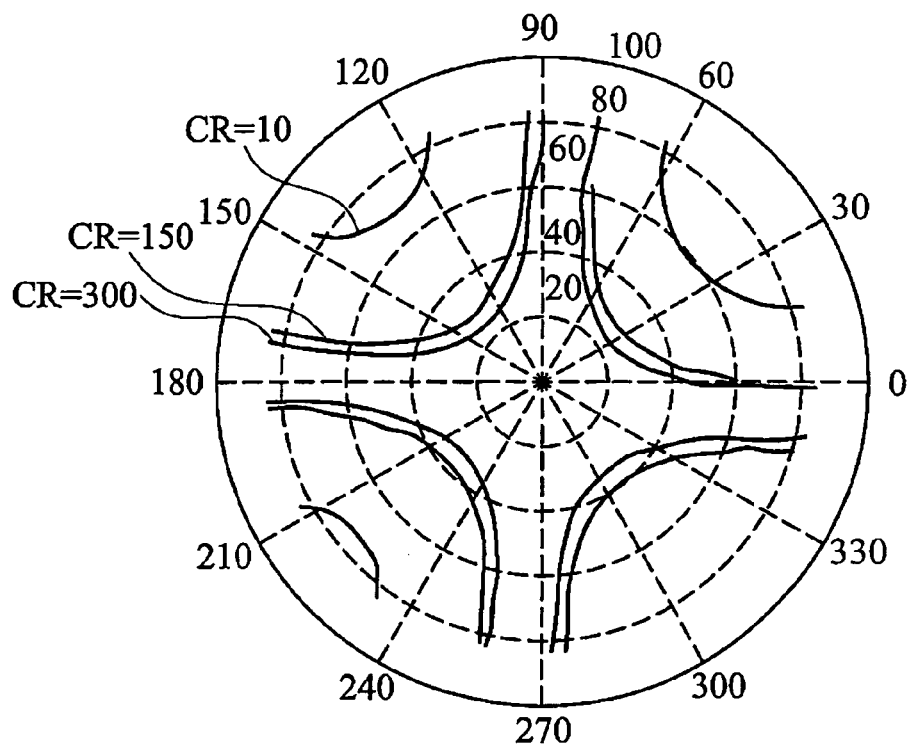
FIG. 20 is a viewing cone of the third test of an embodiment of an FFS-LCD.

FIG. 18 is a graphical plot of the relationship between light transmittance and operating voltage of the third test of an embodiment of an FFS-LCD. The wavelengths of the backlight (not shown) of the FFS-LCD are set at 450 nm, 550 nm, and 650 nm. As shown in FIG. 18, the maximum transmittance reaches 32.5% at the operating voltage of $5V_{rms}$. FIG. 19 is a graphical plot of the relationship between light transmittance and response time of the third test of an embodiment of an FFS-LCD. As shown in FIG. 19, the transmittance reaches above 30% at the response time of about 27 msec when the operating voltage of $5V_{rms}$ is applied. FIG. 20 is a viewing cone wider than ±70° of the third test of an embodiment of an FFS-LCD.

For the purposes of comparison, a test comparable to the third test is provided. The comparison test uses the conventional FFS-LCD shown in FIGS. 2A and 2B as a benchmark. In the comparison test, the liquid crystal material used in the third test was used. Referring to FIGS. 2A and 2B, the width "W" of the electrode 210/220 is 8 μm. Also, the other parameters are the same as the third test.

Figure 21:
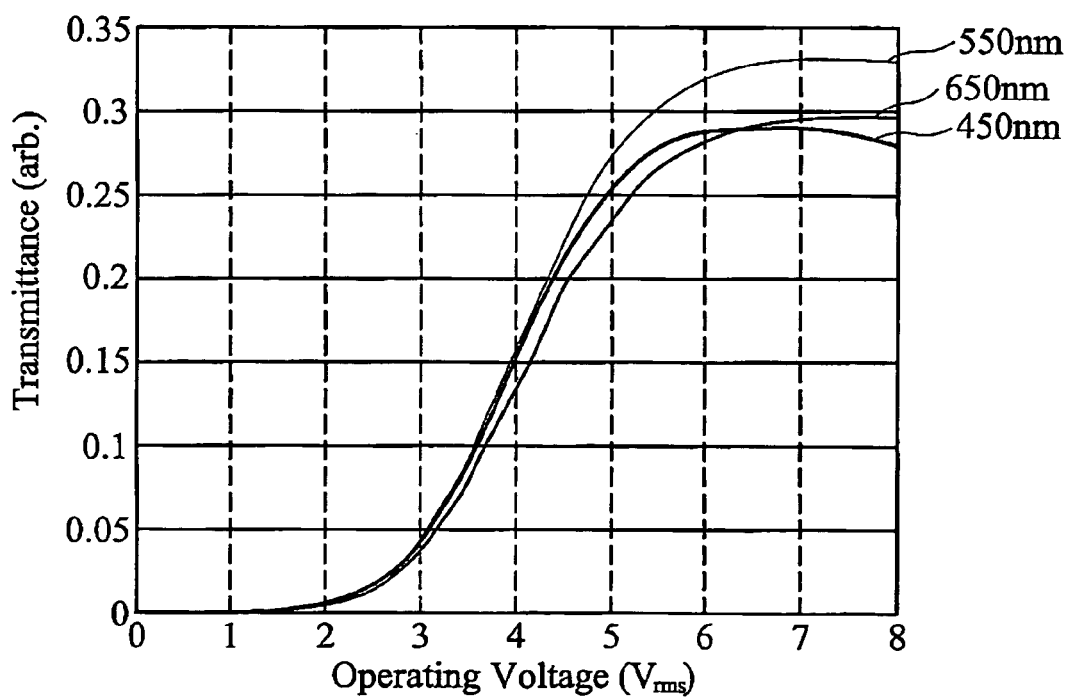
FIG. 21 is a graphical plot of the relationship between light transmittance and operating voltage of a comparison test of the third test.
Figure 22:
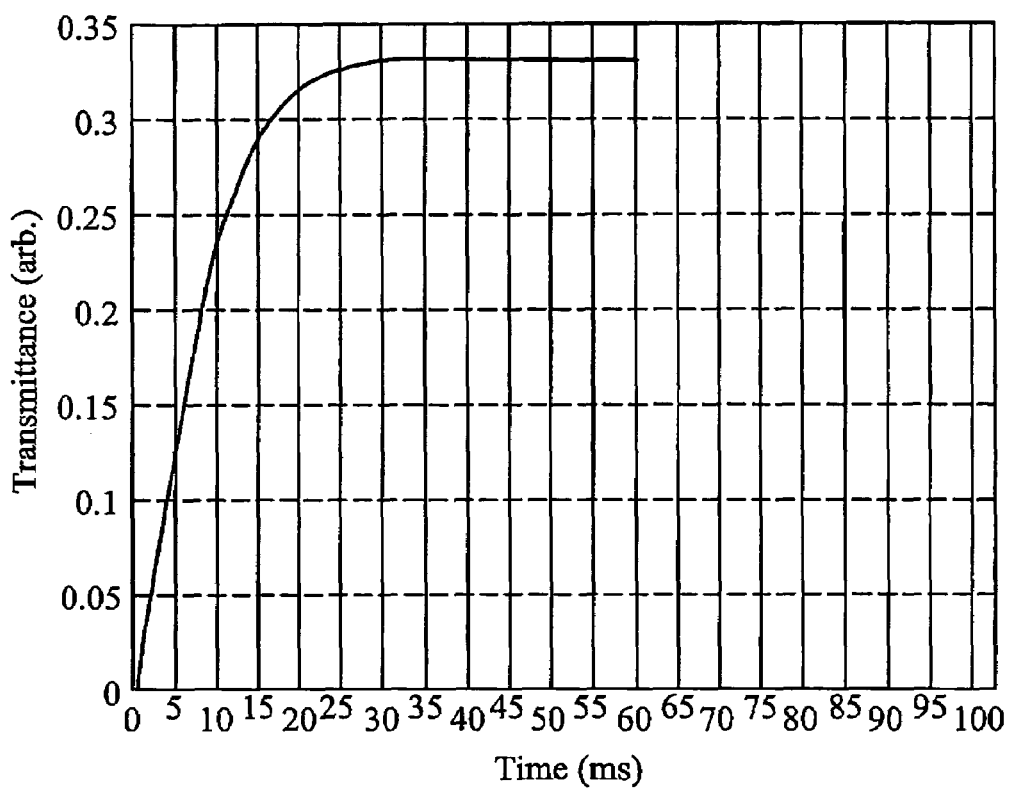
FIG. 22 is a graphical plot of the relationship between light transmittance and response time of the comparison test of the third test.
Figure 23:
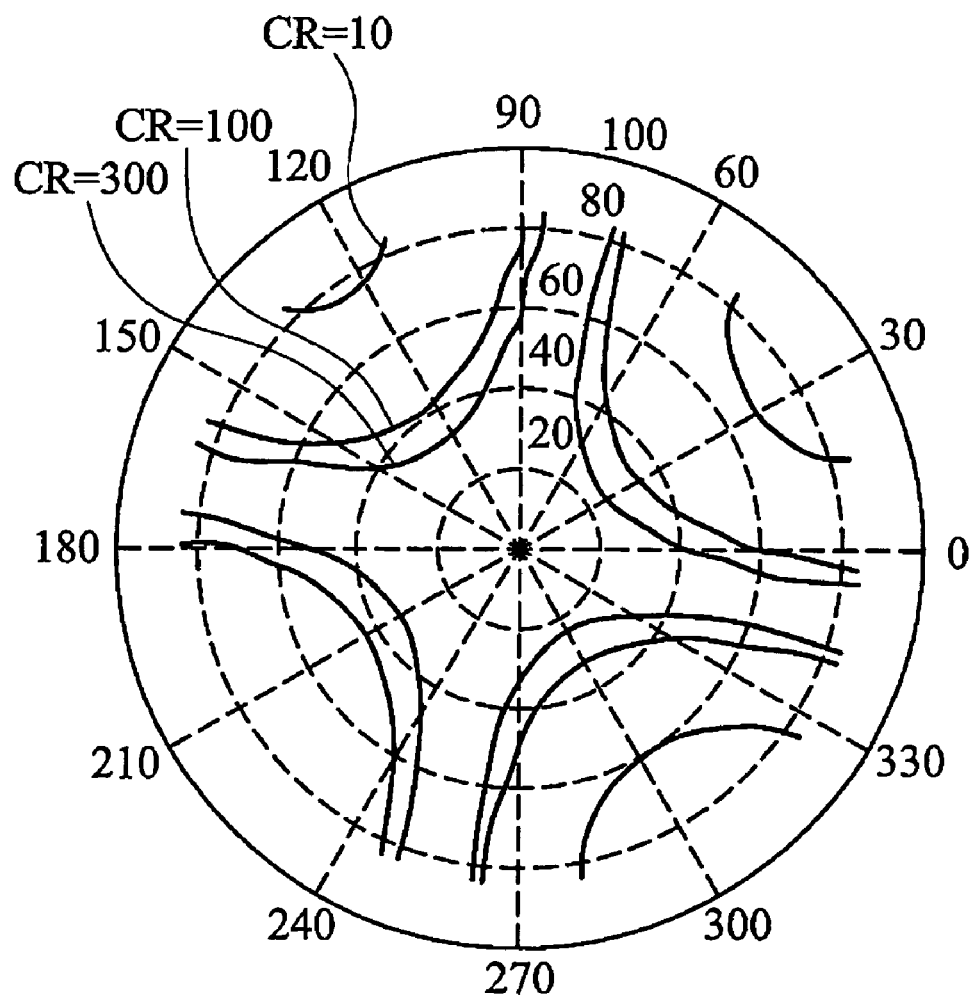
FIG. 23 is a viewing cone of the comparison test of the third test.

FIG. 21 is a graphical plot of the relationship between light transmittance and operating voltage of the comparison test of the third test. The wavelengths of the backlight (not shown) of the conventional FFS-LCD are set at 450 nm, 550 nm, and 650 nm. As shown in FIG. 21, the maximum transmittance reaches 32.5% at the operating voltage of $7V_{rms}$, requiring high power consumption. Note that, referring to FIG. 18, the FFS-LCD of the third test can reach a high transmittance (32.5%) at a lower operating voltage ($5V_{rms}$). FIG. 22 is a graphical plot of the relationship between light transmittance and response time of the comparison test of the third test. As shown in FIG. 22, the maximum transmittance reaches 32.5% at the response time of about 22 msec when the operating voltage of $7V_{rms}$ is applied. FIG. 23 is a viewing cone of the comparison test of the second test, similar to the second test.

Compared with the conventional FFS-LCD, an embodiment of the FFS-LCD has a high transmittance (32.5%) under a lower operating voltage ($5V_{rms}$), thereby decreasing power consumption.

Figure 24:
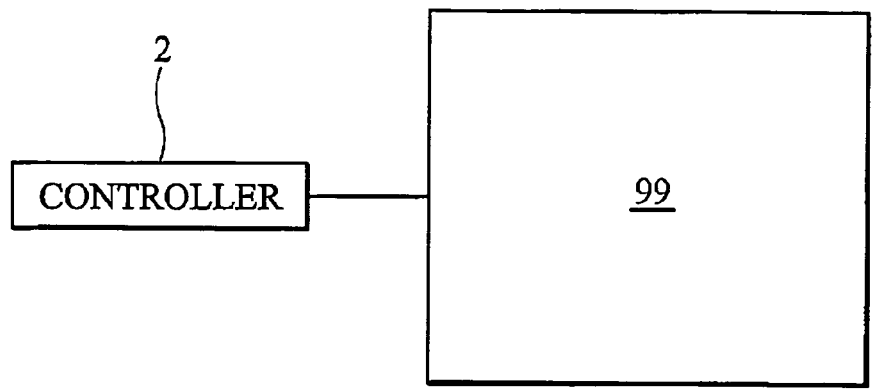
FIG. 24 is a schematic diagram illustrating an embodiment of an FFS-LCD apparatus, incorporating a controller.

An embodiment of an FFS-LCD 99 can be coupled to a controller 2, forming a display device 3 as shown in FIG. 24. The controller 2 can comprise a source and gate driving circuits (not shown) to control the FFS-LCD 99 to render an image in accordance with an input. The display device 3 and associated controller 2 may be directed to a transmissive FFS-LCD apparatus.

Figure 25:
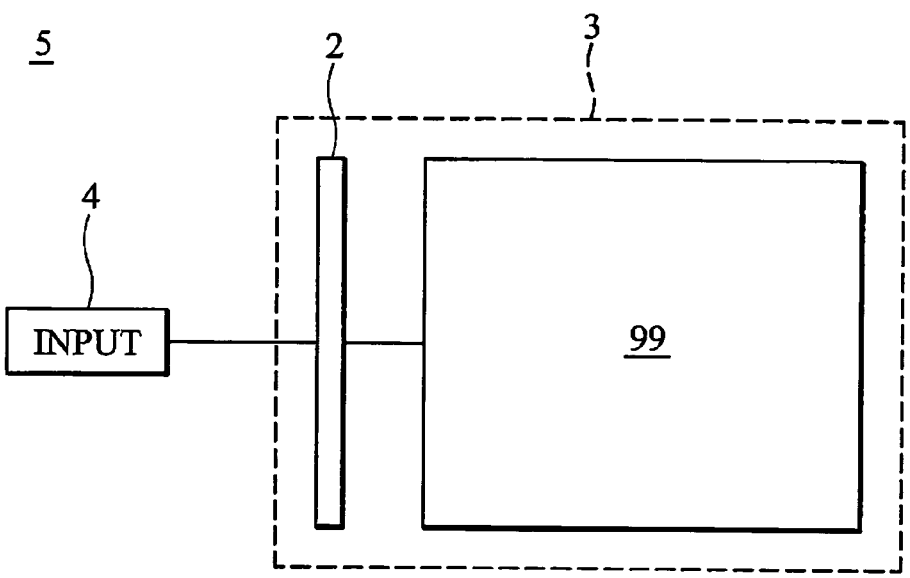
FIG. 25 is a schematic diagram illustrating an electronic device incorporating an embodiment of an FFS-LCD device.

FIG. 25 is a schematic diagram illustrating an electronic device 5 incorporating an embodiment of a transmissive FFS-LCD device 99. An input device 4 can be coupled to the controller 2 of the display device 3 shown in FIG. 24 to form an electronic device 5. The input device 4 can include a processor or the like, inputting data to the controller 2 to render an image. The electronic device 5 may be a portable device such as a PDA, notebook computer, tablet computer, cellular phone, or a display monitor device, or non-portable device such as a desktop computer.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An electrode array structure in a pixel area of a fringe field switching mode LCD (FFS-LCD), comprising:
   a common electrode comprising a first bar extending in a first direction and a plurality of first teeth extending in a second direction from the first bar, wherein at least one first tooth comprises a first bone having a plurality of discontinuous first trapezoidal protrusions on at least one side thereof; and
   a pixel electrode comprising a second bar extending in the first direction and a plurality of second teeth extending in the second direction from the second bar, wherein at least one second tooth comprises a second bone having a plurality of discontinuous second trapezoidal protrusions on at least one side thereof.

2. The electrode array structure according to claim 1, wherein each first tooth is adjacent to each second tooth.

3. The electrode array structure according to claim 2, wherein a top surface of each first trapezoidal protrusion does not directly face that of each second trapezoidal protrusion.

4. The electrode array structure according to claim 2, wherein the first and second bones have the same width "a", the first and second trapezoidal protrusions have the same height "h", a spacing "b" is between the first and second teeth and a relationship among a, h, and b satisfies b<(a+2h).

5. The electrode array structure according to claim 4, wherein the width "a" is between 1.5 μm and 2.5 μm and the height "h" is between 1 μm and 10 μm.

6. The electrode array structure according to claim 4, wherein the width "a" is 2 μm and the height "h" is 1 μm.

7. The electrode array structure according to claim 1, wherein a first included angle between a sidewall of the first trapezoidal protrusion and a normal of the first bone is between 0° and 90°.

8. The electrode array structure according to claim 7, wherein the first included angle is 45°.

9. The electrode array structure according to claim 1, wherein a second included angle between a sidewall of the second trapezoidal protrusion and a normal of the second bone is between 0° and 90°.

10. The electrode array structure according to claim 9, wherein the second included angle is 45°.

11. The electrode array structure according to claim 1, wherein the common electrode and the pixel electrode are coplanar.

12. The electrode array structure according to claim 1, wherein the common electrode is at least one of an indium tin oxide (ITO) layer and an indium zinc oxide (IZO) layer.

13. The electrode array structure according to claim 1, wherein the pixel electrode is at least one of an ITO layer and an IZO layer.

14. A fringe field switching mode liquid crystal display (FFS-LCD), comprising:
 a first substrate and a second substrate with a liquid crystal layer interposed therebetween; and
 a common electrode interdigitated with a pixel electrode formed on the first substrate, wherein an electrical field generated therebetween controls an orientation of liquid crystal molecules in the liquid crystal layer;
 wherein the common electrode comprises a first bar extending in a first direction, a plurality of first teeth extending in a second direction from the first bar and at least one first tooth comprises a first bone having a plurality of discontinuous first trapezoidal protrusions on at least one side thereof; and
 wherein the pixel electrode comprises a second bar extending in the first direction, a plurality of second teeth extending in the second direction from the second bar and at least one second tooth comprises a second bone having a plurality of discontinuous second trapezoidal protrusions on at least one side thereof.

15. The FFS-LCD according to claim 14, wherein each first tooth is adjacent to each second tooth.

16. The FFS-LCD according to claim 15, wherein a top surface of each first trapezoidal protrusion does not directly face that of each second trapezoidal protrusion.

17. The FFS-LCD according to claim 15, wherein the first and second bones have the same width "a", the first and second trapezoidal protrusions have the same height "h", a spacing "b" is between the first and second teeth, and a relationship among a, h and b satisfies b<(a+2h).

18. The FFS-LCD according to claim 17, wherein the width "a" is 2 μm and the height "h" is 1 μm.

19. The FFS-LCD according to claim 14, wherein a first included angle between a sidewall of the first trapezoidal protrusion and a normal of the first bone is 45° and a second included angle between a sidewall of the second trapezoidal protrusion and a normal of the second bone is 45°.

20. The FFS-LCD according to claim 14, wherein the liquid crystal molecules are at least one of positive and negative dielectric anisotropic liquid crystal molecules.

21. An electronic device, comprising:
 a fringe field switching mode liquid crystal display of claim 14;
 a controller coupled to the fringe field switching mode liquid crystal display; and
 an input device coupled to the controller to input data to the controller to render an image.

* * * * *